United States Patent [19]
Taniuchi et al.

[11] Patent Number: 6,013,393
[45] Date of Patent: *Jan. 11, 2000

[54] IONIC CONDUCTIVE POLYMER GEL AND LITHIUM-ION BATTERY USING THE SAME

[75] Inventors: Masahiro Taniuchi, Yokohama; Tomohiro Inoue, Sagamihara; Toshiyuki Kabata, Yokohama; Toshiyuki Ohsawa, Kawasaki; Okitoshi Kimura, Yokohama, all of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,973

[22] Filed: May 8, 1996

[30] Foreign Application Priority Data

| May 9, 1995 | [JP] | Japan | 7-135880 |
| Jun. 29, 1995 | [JP] | Japan | 7-186371 |
| Aug. 10, 1995 | [JP] | Japan | 7-225856 |

[51] Int. Cl.$^7$ .................................................. H01M 10/10
[52] U.S. Cl. ............................................ 429/303; 429/317
[58] Field of Search ...................................... 429/190, 191, 429/192, 303, 317

[56] References Cited

U.S. PATENT DOCUMENTS 5,658,685  8/1997  Oliver ..................................... 429/190
5,658,686  8/1997  Akashi .................................... 429/190

*Primary Examiner*—Stephen Kalafut
*Attorney, Agent, or Firm*—Cooper & Dunham LLP

[57] ABSTRACT

An ionic conductive polymer gel for secondary battery includes an electrolyte salt component which includes a sulfonated derivative with formula (A):

$$LiX(SO_2R^1)_n \qquad (A)$$

wherein X is N, C, B, O or $—C(R^2)_m—$ in which $R^2$ is a hydrogen atom, an alkyl group having 1 to 12 carbon atoms, and m is an integer of 1 to 2; $R^1$ a halogenated alkyl group having 1 to 12 carbon atoms; and n is an integer of 1 to 3; a non-aqueous solvent; and a polymer matrix prepared by polymerizing a polymerizable material comprising at least one acrylate monomer with a molecular weight of 1000 or less, in the presence of the electrolyte salt component and the non-aqueous solvent. A lithium-ion battery utilizes the ionic conductive polymer gel.

20 Claims, No Drawings

IONIC CONDUCTIVE POLYMER GEL AND LITHIUM-ION BATTERY USING THE SAME

BACKGROUND OF THE INVENTION

1. Field of the Invention

The present invention relates to an ionic conductive polymer gel for secondary battery, and also to a lithium-ion battery comprising the ionic conductive polymer gel.

2. Discussion of Background

Conventionally, electrolytic solutions are employed in secondary batteries. However, the use of such an electrolytic solution in a secondary battery has caused various problems, such as the leakage from a secondary battery and the drying of the electrolytic solution in the battery due to the evaporation of the electrolytic solution while in use.

In order to solve these problems, the use of a solid electrolyte has been studied. However, a solid polymer electrolyte comprising an electrolyte salt is a complete solid and therefore has low ionic conductivity and cannot always be used in practice.

In order to increase the ionic conductivity of such a polymeric solid electrolyte, it has been proposed to use, for example, siloxane as a polymeric solid electrolyte as disclosed in U.S. Pat. No. 5,112,512 and phosphazene as disclosed in U.S. Pat. No. 4,849,856.

However, the ionic conductivities of these polymeric ionic conductivities are still insufficient for use in practice in secondary batteries.

Recently, there have been proposed ionic conductive polymer gels, which comprise a polymer matrix, which may be a thermoplastic polymer matrix or a cross-linked polymer matrix, a solvent and an electrolyte salt. These ionic conductive polymer gels, however, cannot satisfy the requirements that they have both high physical strength and high ionic conductivity for use in secondary battery, at the same time.

SUMMARY OF THE INVENTION

It is therefore a first object of the present invention to provide an ionic conductive polymer gel for use in secondary battery, which has sufficiently high ionic conductivity and physical strength for use in a secondary battery.

A second object of the present invention is to provide a lithium secondary battery with excellent performance.

The first object of the present invention can be achieved by an ionic conductive polymer gel for secondary battery comprising:

an electrolyte salt component which comprises a sulfonated derivative with formula (A):

$$LiX(SO_2R^1)_n \quad (A)$$

wherein X is N, C, B, O or —$C(R^2)_m$— in which $R^2$ is a hydrogen atom, an alkyl group having 1 to 12 carbon atoms, and m is an integer of 1 to 2; $R^1$ is a halogenated alkyl group having 1 to 12 carbon atoms; and n is an integer of 1 to 3;

a non-aqueous solvent; and a polymer matrix prepared by polymerizing a polymerizable material comprising at least one acrylate monomer with a molecular weight of 1000 or less, in the presence of said electrolyte salt component and said non-aqueous solvent.

In the above ionic conductive polymer gel, the polymerizable material may comprise at least two acrylate monomers, each having a molecular weight of 1000 or less, one acrylate monomer having an acrylic group in the molecule thereof, and the other having at least two acrylic groups in the molecule thereof.

Furthermore, in the above ionic conductive polymer gel, at least one of the acrylate monomers in the polymerizable material may comprise an alkylene oxide group in the molecule thereof.

In the above ionic conductive polymer gel, the polymer matrix may be formed by polymerization of the polymerizable material which utilizes a photochemical process.

Furthermore, in the ionic conductive polymer gel of the present invention, the polymer matrix may be formed by polymerizing the polymerizable material in the presence of a photopolymerization initiator and a heat polymerization initiator.

In the ionic conductive polymer gel of the present invention, the non-aqueous solvent may comprise a cyclic carbonate and a chain carbonate.

The above non-aqueous solvent may comprise propylene carbonate in an amount of 10 to 50 wt. % of the entire amount of the non-aqueous solvent.

In the ionic conductive polymer gel of the present invention, the electrolyte salt component may further comprise an inorganic electrolyte salt.

The amount ratio by weight of the sulfonated derivative to the inorganic electrolyte salt may be in the range of 10:90 to 90:10.

The second object of the present invention can be achieved by a lithium-ion battery which comprises the above-mentioned ionic conductive polymer gel, serving as an electrolyte.

DESCRIPTION OF THE PREFERRED EMBODIMENTS

The ionic conductive polymer gel of the present invention has an ionic conductivity of $1 \times 10^{-3}$ S/cm or more, measured at 25° C. by an alternate impedance method. The ionic conductivity of the ionic conductive polymer gel is generally greatly affected by the ionic conductivity of the non-aqueous solvent employed therein. However, the ionic conductivity of the ionic conductive polymer gel of the present invention is in the above-mentioned range.

The elasticity of the ionic conductive polymer gel of the present invention, measured by a dynamic viscoelasticity testing machine (Trademark "RDS-7700" made by RHEOMETRIC INC.), is $10^2$ dyne/cm$^2$ or more, and the glass transition temperature (Tg) thereof is −30° C. or less. The ionic conductive polymer gel is not melted when heated to 100° C. The elongation thereof is 20% or more. The ionic conductive polymer gel of the present invention has a recovery power up to a maximum of about 400% draw deformation without breaking. Furthermore, it does not break when folded 180 degrees.

The measurement of the deformation with time of the ionic conductive polymer gel of the present invention by use of a creep meter (Trademark "RE-3305" commercially available from Sanden Co., Ltd.) with a plunger cross section area of 2 cm$^2$ and a load of 30 g indicated that the ionic conductive polymer gel of the present invention has low creep characteristics with no deformation with time. Even if the ionic conductive polymer gel of the present invention is pressed by the creep meter with application of a load of 25 g/cm$^2$ thereto, the electrolytic solution contained therein does not leak out. Furthermore, this ionic conductive polymer gel exhibits high adhesiveness, so that when these gels are applied to each other, neither can be peeled away from the applied surface without being broken.

The ionic conductive polymer gel of the present invention can be formed by subjecting polymerizable materials to a polymerization reaction in an non-aqueous electrolytic solution. The polymerizable materials used here exhibit not only thermal polymerizability, but also polymerizability by light and active rays such as ultraviolet rays, electron beams, gamma rays, and X-rays.

Examples of the polymerizable materials for use in the present invention are monomers or prepolymers of monofunctional or polyfunctional (meth)acrylate. The term "(meth)acrylate" means methacrylate or acrylate.

Specific examples of monofunctional acrylate are alkyl (meth)acrylates such as methyl (meth)acrylate, butyl (meth)acrylate, and trifluoroethyl (meth)acrylate; alicyclic (meth)acrylates such as tetrahydrofurfuryl (meth)acrylate; hydroxyalkyl (meth)acrylates such as hydroxyethyl acrylate and hydroxypropyl acrylate; hydroxypolyoxyalkylene (meth)acrylates (preferably the oxylenealkyl group having 1 to 4 carbon atoms) such as hydroxypolyoxyethylene (meth)acrylate and hydroxypolyoxypropylene (meth)acrylate; and alkoxy (meth)acrylates (preferably the alkoxy group having 1 to 4 carbon atoms) such as methoxyethyl acrylate, ethoxyethyl acrylate, and phenoxyethyl acrylate.

Specific examples of other (meth)acrylates are alkylethylene glycols such as methylethylene glycol (meth)acrylate, ethylethylene glycol (meth)acrylate, propylethylene glycol (meth)acrylate, ethoxydiethylene glycol acrylate, methoxyethyl acrylate, methoxydiethylene glycol methacrylate, methoxytriethylene glycol acrylate, methoxy-triethylene glycol methacrylate, and methoxy-tetraethylene glycol methacrylate; phenylethylene glycol acrylate; and alkylpropylene glycol (meth)acrylates such as ethyl-propylene glycol acrylate, butylpropylene glycol acrylate, and methoxydipropylene glycol acrylate.

The above-mentioned (meth)acrylates may include a heterocyclic group in the molecules thereof. Examples of such a heterocyclic group are heterocyclic groups including a hetero atom such as oxygen, nitrogen or sulfur.

There is no particular restriction to the heterocyclic group to be included in the molecules of the above-mentioned (meth)acrylates, but specific examples of such a heterocyclic group are furfuryl group and tetrahydrofurfuryl group.

Preferable examples of (meth)acrylates including such a heterocyclic group are furfuryl (meth)acrylate, and tetrahydrofurfuryl (meth)acrylate.

Examples of (meth)acrylates including other heterocyclic groups are furfuryl-group- or tetrahydrofurfuryl-group-containing alkylene glycol acrylates such as furfurylethylene glycol (meth)acrylate, tetrahydro-furfurylethylene glycol (meth)acrylate, furfurylpropylone glycol (meth)acrylate, and tetrahydrofurfurylpropylene glycol (meth)acrylate.

It is preferable that the above-mentioned monofunctional acrylate monomer be employed in an amount of 50 wt. % or less, more preferably in an amount of 5 to 40 wt. %, further more particularly in an amount of 10 to 30 wt. %, with respect to the amount of a non-aqueous electrolytic solution which is composed of an electrolyte salt component and a non-aqueous solvent.

As a polyfunctional acrylate monomer for use in a polymerizable material in the present invention, an acrylate monomer or prepolymer having at least two (meth)acryloyl groups is preferable. This is because by use of the above-mentioned acrylate monomer in combination with the previously mentioned monofunctional acrylate monomer, an ionic conductive polymer gel having excellent elasticity and high ionic conductivity can be obtained.

In particular, trifunctional (meth)acrylate monomers having three (meth)acryloyl groups are preferable. This is because by use of such trifunctional (meth)acrylate monomers, there can be produced an ionic conductive polymer gel with excellent liquid-retaining performance, high ionic conductivity and high strength, Specific examples of such polyfunctional (meth)acrylate monomers are ethylene glycol dimethacrylate, diethylene diglycol di(meth)acrylate, tetraethylene glycol di(meth)acrylate, triethylene glycol di(meth)acrylate, tripropylene glycol diacrylate, EO-modified trimethylopropane triacrylate, PO-modified trimethylolpropane triacrylate, butanediol di(meth)acrylate, trimethylolpropane tri(meth)acrylate, and dipentaerythritol hexa(meth)acrylate.

It is preferable that the (meth)acrylate monomers and prepolymers for use in the present invention have a molecular weight of 1000 or less, more preferably 500 or less. This is because when the molecular weight thereof exceeds 1000, the non-aqueous solvent retained in the ionic conductive polymer gel is apt to ooze therefrom while in use. Furthermore, when the acrylate monomer with a molecular weight of 1000 or less is used for a polymer matrix for the ionic conductive polymer gel of the present invention, not only the ionic conductivity thereof, but also the modulus of elasticity thereof can be significantly improved, and accordingly the cycle life of a lithium-ion battery utilizing the ionic conductive polymer gel is particularly improved.

Any of the above-mentioned (meth)acrylate monomers can be used alone or in combination in the present invention.

When any of the previously mentioned monofunctional acrylate monomers is employed in combination with any of the above-mentioned polyfunctional acrylate monomers, it is preferable that the above-mentioned polyfunctional acrylate monomer be employed in an amount of 4 wt. % or less, more preferably in an amount of 0.05 to 2 wt. %, with respect to the amount of the non-aqueous electrolytic solution which is composed of an electrolyte salt component and a non-aqueous solvent.

In particular, when a trifunctional acrylate monomer is used in combination with any of the previously mentioned monofunctional acrylate monomers, it is preferable that the trifunctional acrylate monomer be employed in an amount of 2 wt. % or less, more preferably in an amount of 0.05 to 0.5 wt. %, with respect to the amount of the non-aqueous electrolytic solution, in order to obtain an ionic conductive polymer gel with excellent ionic conductivity and physical strength.

The electrolyte salt component for use in the ionic conductive polymer gel of the present invention comprises a sulfonated derivative with formula (A):

$$LiX(SO_2R^1)_n \qquad (A)$$

wherein X is N, C, B, O or $-C(R^2)_m-$ in which $R^2$ is a hydrogen atom, an alkyl group having 1 to 12 carbon atoms, and m is an integer of 1 to 2; $R^1$ is a halogenated alkyl group having 1 to 12 carbon atoms; and n is an integer of 1 to 3.

Specific examples of the sulfonated derivative with formula (A) are $LiCF_3SO_3$, $LiN(CF_3SO_2)_2$, $LiO(CF_3SO_2)$, $LiC(CF_3SO_2)_3$, $LiCH(CF_3SO_2)_2$, and $LiB(CF_3SO_2)_2$.

The above-mentioned sulfonated derivatives have properties of oxidizing and corroding metal, in particular, positive electrode collector metal. In order to inhibit the corrosiveness of the sulfonated derivative, it is necessary to add some corrosion inhibitor.

As such a corrosion inhibitor, inorganic electrolyte salts, such as $LiPF_6$ and $LiBF_4$, are effective.

When such an inorganic salt is employed as the above-mentioned corrosion inhibitor in combination with the sulfonated derivative, it is preferable that the amount of the inorganic salt be in the range of 1 to 9 moles per one mole of the sulfonated derivative, since when the amount of the inorganic salt exceeds 9 moles per one mole of the sulfonated derivative, sufficient effect of the sulfonated derivative cannot be obtained, while when the amount of the inorganic salt is less than 1 mole per one mole of the sulfonated derivative, the corrosion inhibition effect of the inorganic salt could not be obtained sufficiently.

The concentration of the sulfonated derivative serving as an electrolyte salt, in a non-aqueous electrolytic solution is normally in the range of 1.0 to 7.0 moles/l, and preferably in the range of 2.0 to 5.0 moles/l. When the concentration is less than 1.0 mole/l, an ionic conductive polymer gel having sufficient strength cannot be obtained. When the concentration of the sulfonated derivative exceeds 7.0 moles/l, dissolving the sulfonated derivative in a non-aqueous solvent becomes difficult.

The amount of the non-aqueous electrolytic solution is normally 200 parts by weight or more, preferably in the range of 400 to 900 parts by weight, more preferably in the range of 500 to 800 parts by weight, to 100 parts by weight of a polymer matrix for the ionic conductive polymer gel of the present invention. When the amount of the non-aqueous electrolytic solution is less than 200 parts by weight, a sufficiently high ionic conductivity cannot be obtained, while when the amount exceeds 900 parts by weight to 100 parts by weight of the polymer matrix, the solidification of the non-aqueous electrolytic solution becomes difficult.

Examples of a non-aqueous solvent for use in the present invention include cyclic esters such as propylene carbonate and ethylene carbonate; chain esters such as dimethyl carbonate and diethyl carbonate; 1,2-dimethoxyethane; 1,2-ethoxyethane; glimes such as methyl diglime, methyl triglime, methyl tetraglime, ethyl glime, ethyl diglime, and butyl diglime; sulfolane; dioxolane; tetrahydrofuran; 2-methyl tetrahydrofuran; dimethyl sulfoxide; and γ-butyrolactone.

It is preferable that the above-mentioned cyclic esters and chain esters be employed in combination for having the electrolyte salt exhibit its best performance in the ionic conductive polymer gel.

For example, by use of dimethyl carbonate and propylene carbonate in combination, high strength and high ionic conductivity are imparted to the ionic conductive polymer gel, respectively by propylene carbonate and by dimethyl carbonate.

As initiators for preparing the polymer matrix for use in the ionic conductive polymer gel of the present invention by polymerizing a polymerizable material, the following materials, for example, can be employed, provided when radiation polymerization is conducted, such initiators are not always necessary.

Photopolymerization initiators such as carbonyl compounds, for example, benzoin compounds such as benzoin, benzoin methyl ether, benzoin ethyl ether, benzoin isopropyl ether, benzoin isobutyl ether, α-methyl benzoin, and α-phenyl benzoin; anthraquinone compounds such as anthraquinone, methylanthraquinone, chloroanthraquinone; other compounds such as benzil, diacetyl, acetophenone, benzophenone, and methylbenzoylfomate; sulfides such as diphenylsulfide and dithiocarbamate; halides of polycondensation cyclic hydrocarbons such as α-chloromethyl naphthalene; dyes such as acryl fravin, and fluorecein; metal salts such as iron chloride and silver chloride; and onium salts such as p-methoxybenzene diazonium, hexafluorophosphate, and diphenyliodonium triphenyl sulfonium.

These polymerization initiators can be used alone or in the form of a mixture of two or more. Preferable photopolymerization initiators for use in the present invention are the carbonyl compounds, the sulfides and the onium salts.

Furthermore, thermal polymerization initiators such as azobisisobutyronitrile, benzoyl peroxide, lauroyl peroxide, ethyl methyl ketone peroxide, bis(4-t-butylcyclohexyl) peroxidicarbonate, and diisoprolyl peroxidicarbonate can be used in combination with the above-mentioned polymerization initiators.

Furthermore, polymerization initiators such as dimethylaniline, cobalt naphthenate, sulfinic acid, and mercaputan can also be employed in combination with the above polymerization initiators. Furthermore, sensitizers and preservation stabilizing agents can also be employed in combination with the above polymerization initiators when necessary.

In particular, by using the above-mentioned photopolymerization initiators and thermal polymerization initiators in combination, an ionic conductive polymer gel with high coefficient of elasticity can be obtained.

The photopolymerization initiators and thermal polymerization initiators for use in the present invention are not limited to the above-mentioned initiators. When a photopolymerization initiator and a thermal polymerization initiator are used in combination, it is preferable that benzoylisopropyl ether which is a photopolymerization initiator and bis(4-t-butylcyclohexyl)peroxidicarbonate which is a thermal polymerization initiator be employed in combination.

Furthermore, heat generated by light radiation during the polymerization process can also contribute to the promotion of the polymerization.

The ionic conductive polymer gel of the present invention can be prepared by injecting into a sealed container a non-aqueous electrolytic composition which comprises the previously mentioned electrolyte salt component comprising the sulfonated derivative of formula (A), a non-aqueous solvent, and a polymerizable material comprising at least one acrylate monomer with a molecular weight of 1000 or less; or by coating the non-aqueous electrolytic composition on a support, for instance, made of a film, metal or glass, followed by polymerizing the polymerizable material with application of heat or active light rays in the presence of the electrolyte salt component and the non-aqueous solvent. As the active light rays, normally light, ultraviolet rays, electron rays and X-rays can be employed. Of these active light rays, those having a main wavelength in the range of 100 to 800 nm are preferable for use in the present invention.

The thus prepared ionic conductive polymer gel can be worked into a product in the form of a film or a sheet, or in a composite form in combination with a constituent part of a secondary battery.

As an active material for A negative electrode for use in a lithium-ion battery of the present invention, there can be employed lithium, lithium-aluminum alloy, lithium-tin alloy, and lithium-magnesium alloy; and intercalation compounds capable of occluding lithium ion, such as carbon materials, carbon-boron-substituted materials, for example, $BC_2N$, and tin oxide.

In the present invention, the use of such intercalation compounds in the negative electrode is remarkably effective for improving the cycle life of the battery of the present invention which employs the previously mentioned electrolyte salt component.

Examples of carbon materials used as a negative active material for the negative electrode of the battery of the present invention are graphite, pitch coke, sintered synthetic organic polymers and natural polymers.

Specific examples of carbon materials for use as a negative active material for the negative electrode in the battery of the present invention are as follows:

(1) Insulating or semiconductive carbons which can be obtained by sintering any of synthetic polymers such as polymers made from phenol, and polyimide, and natural polymers in a reducing atmosphere at a temperature of 400 to 800° C.;

(2) Eletroconductive carbons which can be obtained by sintering any of coal, pitch, synthetic polymers, and natural polymers in a reducing atmosphere at a temperature of 800 to 1300° C.; and (3) Carbon materials which can be obtained by sintering any of coke, pitch, synthetic polymers, and natural polymers in a reducing atmosphere at a temperature of 2000° C. or more.

Examples of active materials for the positive electrode in the battery of the present invention include transition metal oxides, transition metal chalcogenite compounds such as $TiS_2$, $MoS_2$, $FeO_2$, $Co_2S_5$, $V_2O_5$, $MnO_2$, and $CoO_2$, and composite material of Li and the above-mentioned oxides and compounds, such as Li-composite materials such as $LiV_2O_5$, $LiNiO_2$, $LiMnO_2$, $LiMn_2O_4$, and $LiCoO_2$, and fluorocarbons.

Such inorganic active materials are generally employed in a molded form with application of pressure thereto by use of a binder agent such as tetrafluoroethylene resin powder.

Further examples of active materials for the positive electrode in the battery of the present invention are electroconductive polymers with an electroconductivity of $10^{-12}$ S/cm or more, such as polyaniline, polypyrrole, polyazulene, polyphenylene, polyacetylene, polyacene, polyphthalocyanine, poly-3-methylthiophene, polypyridine, and polydiphenylbenzidine.

Composite active materials composed of any of the above-mentioned organic materials and previously mentioned inorganic materials can also be employed as active materials for the positive electrode of the battery of the present invention.

Conventionally employed active materials for positive electrodes of conventional secondary batteries can also be employed in the present invention.

Examples of the material for a current collector for the positive electrode for use in the present invention are metal sheet, metallic foil, metal net, punching metal, expand metal, made of stainless steel, gold, platinum, nickel, aluminum, molybdenum, titanium or copper; and a net or unwoven fabric made of metal plating fibers, metal-deposited wires, or metal-containing synthetic fibers, comprising any of the above-mentioned metals.

As the current collector for the negative electrode, the same current collector as that for the positive electrode can also be employed.

As the material for the current collector for the positive electrode, aluminum, stainless steel and titanium are preferable in view of the electroconductivity, chemical and electrochemical stability, cost, and workability thereof.

In the present invention, the ionic conductive polymer gel itself can be used as a separator of the battery of the present invention. In this case, fillers may be dispersed therein or a porous film, which is conventionally used as a separator, can be combined with the ionic conductive polymer gel.

Specific examples of such a separator are a glass fiber filter, an unwoven filter made of fibers of a polymer such as polyester, Tefon, Polyflon and polypropylene, and unwoven filters made of combinations of glass fibers and polymer fibers.

A battery of the present invention can be fabricated by forming the ionic conductive polymer gel with application of heat or active rays to polymerize a polymerizable material for the formation of a polymer matrix, in the presence of the previously mentioned electrolyte salt component and non-aqueous solvent, preferably in such a manner that the formed ionic conductive polymer gel and battery elements such as electrodes, and separator are integrated.

Each battery element and the ionic conductive polymer gel may be integrated with each battery element, but such integration can be applied with respect to the combination of a positive electrode and a separator, the combination of a negative electrode and a separator, and the combination of a positive electrode, a negative electrode and a separator.

When the battery elements and the ionic conductive polymer gel are integrated in this manner, the reaction at the positive and negative electrodes and the ion transfer proceed smoothly, so that the inner resistance of the battery can be significantly reduced.

The present invention will now be explained in more detail with reference to the following examples. The present invention is not limited to these examples. Hereinafter, the terms "part(s)" and "%" respectively mean "parts by weight" and "wt. %".

Each non-aqueous solvent and each electrolytic salt were sufficiently purified, with the content of water reduced to 20 ppm or less, followed by the elimination of oxygen and nitrogen therefrom, with the purity grades thereof being set for use in batteries. Experiments were all conducted in an atmosphere of argon. The measurement of ionic conductivity was conducted at 25° C.

The measurement of the ionic conductivity of each ionic conductive polymer gel was conducted by filling an ionic conductive polymer gel in a cylindrical container made of SUS with an inner diameter of 20 mm, with the inner peripheral surface except the inner bottom surface thereof being covered with an insulating tape, which constitutes a counter electrode, and placing a cylinder made of SUS with a diameter of 18 nm, which serves as a work electrode, in pressure contact with the surface of the ionic conductive polymer gel.

Thus, an ionic conductivity measurement cell was fabricated.

In the following examples, various ionic conductive polymer gels were prepared:

EXAMPLE 1

To 50 parts by weight of an electrolytic solution of $LiN(CF_3SO_2)_2$ with a concentration of 1.5 mol/l dissolved in ethylene carbonate/propylene carbonate (5/5 parts by weight), there were added 10.5 parts by weight of methyldiethylene glycol acrylate serving as monofunctional acrylate monomer, 0.5 parts by weight of EO-modified trimethylol propane triacrylate with a molecular weight of 428, and 0.03 parts by weight of benzophenone serving as a photopolymerization initiator.

The above mixture was stirred to prepare a polymerizable solution.

This polymerizable solution was placed in the previously mentioned ionic conductivity measurement cell and irradiated with a high pressure mercury lamp provided with a cold mirror condenser, whereby an ionic conductive polymer gel No. 1 of the present invention was prepared.

The ionic conductivity of the thus prepared ionic conductive polymer gel No. 1 was $2.3 \times 10^{-3}$ S/cm, and the modulus of elasticity thereof was $3.7 \times 10^3$ dyne/cm$^2$.

COMPARATIVE EXAMPLE 1

The procedure for preparing the ionic conductive polymer gel No. 1 in Example 1 was repeated except that the electrolytic solution of $LiN(CF_3SO_2)_2$ employed in Example 1 was replaced by an electrolytic solution of $LiBF_4$ with a concentration of 1.5 mol/l in ethylene/propylene carbonate (5/5 parts by weight), whereby a comparative ionic conductive polymer gel No. 1 was prepared.

The ionic conductivity of the thus prepared comparative ionic conductive polymer gel No. 1 was $4.7 \times 10^{-4}$ S/cm, and the modulus of elasticity thereof was $1.4 \times 10^4$ dyne/cm$^2$.

EXAMPLE 2

The procedure for preparing the ionic conductive polymer gel No. 1 in Example 1 was repeated except that the concentration of the electrolytic solution of $LiN(CF_3SO_2)_2$ in ethylene/propylene carbonate (5/5 parts by weight) employed in Example 1 was increased to 2 mol/l, whereby an ionic conductive polymer gel No. 2 of the present invention was prepared.

The ionic conductivity of the thus prepared ionic conductive polymer gel No. 2 was $2.4 \times 10^{-3}$/cm, and the modulus of elasticity thereof was $2.8 \times 10^3$ dyne/cm$^2$.

COMPARATIVE EXAMPLE 2

To 50 parts by weight of an electrolytic solution of $LiN(CF_3SO_2)_2$ with a concentration of 2 mol/l dissolved in ethylene carbonate/propylene carbonate/dimethyl carbonate (5/2/3 parts by weight), there were added 10.5 parts by weight of methyldiethylene glycol acrylate serving as monofunctional acrylate monomer, 0.5 parts by weight of polyethylene glycol dimethacrylate with a molecular weight of 1166, and 0.03 parts by weight of benzophenone serving as a photo-polymerization initiator.

The above mixture was stirred to prepare a polymerizable solution.

This polymerizable solution was polymerized in the same manner as in Example 1, whereby a comparative ionic conductive polymer gel No. 2 was prepared.

The ionic conductivity of the thus prepared comparative ionic conductive polymer gel No. 2 was $8.2 \times 10^{-4}$ S/cm, and the modulus of elasticity thereof was $7.3 \times 10^2$ dyne/cm$^2$.

EXAMPLE 3

To 86 parts by weight of an electrolytic solution of $LiN(CF_3SO_2)_2$ with a concentration of 1.8 mol/l and $LiBF_4$ with a concentration of 0.2 mol/l in ethylene carbonate/propylene carbonate/dimethyl carbonate (5/2/3 parts by weight), there were added 13.8 parts by weight of ethoxydiethylene glycol acrylate serving as monofunctional acrylate monomer, 0.2 parts by weight of trimethylolpropane triacrylate, and 0.056 parts by weight of benzoin isopropyl ether serving as a photopolymerization initiator.

The above mixture was stirred to prepare a polymerizable solution.

This polymerizable solution was polymerized in the same manner as in Example 1, whereby an ionic conductive polymer gel No. 3 of the present invention was prepared.

The ionic conductivity of the thus prepared ionic conductive polymer gel No. 3 was $2.5 \times 10^{-3}$ S/cm, and the modulus of elasticity thereof was $3.3 \times 10^3$ dyne/cm$^2$.

COMPARATIVE EXAMPLE 3

The procedure for preparing the ionic conductive polymer gel No. 3 in Example 3 was repeated except that the electrolytic solution of $LiN(CF_3SO_2)_2$ with a concentration of 1.8 mol/l and $LiBF_4$ with a concentration of 0.2 mol/l was replaced by an electrolytic solution of $LiBF_4$ with a concentration of 2 mol/l in ethylene carbonate/propylene carbonate/dimethyl carbonate (5/2/3 parts by weight), whereby a comparative ionic conductive polymer gel No. 3 was prepared.

The ionic conductivity of the thus prepared comparative ionic conductive polymer gel No. 3 was $5.0 \times 10^{-4}$ S/cm, and the modulus of elasticity thereof was $1.3 \times 10^4$ dyne/cm$^2$. The elasticity was sufficient, but the ionic conductivity was insufficient for use in practice.

EXAMPLE 4

To 86 parts by weight of an electrolytic solution of $LiC(CF_3SO_2)_3$ with a concentration of 1.8 mol/l and $LiBF_4$ with a concentration of 0.2 mol/l in ethylene carbonate/propylene carbonate/dimethyl carbonate (5/2/3 parts by weight), there were added 13.8 parts by weight of ethoxydiethylene glycol acrylate serving as a monofunctional acrylate monomer, 0.2 parts by weight of trimethylolpropane triacrylate serving as a polyfunctional acrylate monomer and 0.056 parts by weight of benzoin isopropyl ether serving as a photopolymerization initiator.

The above mixture was stirred to prepare a polymerizable solution.

This polymerizable solution was polymerized in the same manner as in Example 1, whereby an ionic conductive polymer gel No. 4 of the present invention was prepared.

The ionic conductivity of the thus prepared ionic conductive polymer gel No. 4 was $2.0 \times 10^{-3}$ S/cm, and the modulus of elasticity thereof was $2.9 \times 10^3$ dyne/cm$^2$.

COMPARATIVE EXAMPLE 4

The procedure for preparing the ionic conductive polymer gel No. 4 in Example 4 was repeated except that the trimethylolpropane triacrylate serving as a polyfunctional acrylate monomer employed in Example 4 was replaced by polyethylene glycol dimethacrylate having a molecular weight of 1166, whereby a comparative ionic conductive polymer gel No. 4 was prepared.

The ionic conductivity of the thus prepared comparative ionic conductive polymer gel No. 4 was $4.1 \times 10^{-4}$ S/cm, and the modulus of elasticity thereof was $6.8 \times 10^2$ dyne/cm$^2$.

EXAMPLE 5

To 86 parts by weight of an electrolytic solution of $LiN(CF_3SO_2)_2$ with a concentration of 1.7 mol/l and $LiBF_4$ with a concentration ot 0.3 mol/l in ethylene carbonate/propylene carbonate/dimethyl carbonate (4/2/4 parts by weight), there were added 13.8 parts by weight of ethoxydiethylene glycol acrylate serving as monofunctional acrylate monomer, 0.2 parts by weight of trimethylolpropane triacrylate, and 0.056 parts by weight of benzoin isopropyl ether serving as a photopolymerization initiator.

The above mixture was stirred to prepare a polymerizable solution.

This polymerizable solution was polymerized in the same manner as in Example 1, whereby an ionic conductive polymer gel No. 5 of the present invention was prepared.

The ionic conductivity of the thus prepared ionic conductive polymer gel No. 5 was $2.3 \times 10^{-3}$ S/cm, and the modulus of elasticity thereof was $3.5 \times 10^3$ dyne/cm$^2$.

EXAMPLE 6

The procedure for preparing the ionic conductive polymer gel No. 5 in Example 5 was repeated except that the ethylene carbonate/propylene carbonate/dimethyl carbonate (4/2/4 parts by weight) employed in Example 5 was replaced by ethylene carbonate, whereby an ionic conductive polymer gel No. 6 of the present invention was prepared.

The ionic conductivity of the thus prepared ionic conductive polymer gel No. 6 was $1.0 \times 10^{-3}$ S/cm, and the modulus of elasticity thereof was $3.0 \times 10^3$ dyne/cm$^2$.

EXAMPLE 7

The procedure for preparing the ionic conductive polymer gel No. 3 in Example 3 was repeated except that the ethylene carbonate/propylene carbonate/dimethyl carbonate (5/2/3 parts by weight) employed in Example 3 was replaced by ethylene carbonate/propylene carbonate/dimethyl carbonate (5/1/4 parts by weight), whereby an ionic conductive polymer gel No. 7 of the present invention was prepared.

The ionic conductivity of the thus prepared ionic conductive polymer gel No. 7 was $2.6 \times 10^{-3}$ S/cm, and the modulus of elasticity thereof was $2.8 \times 10^3$ dyne/cm$^2$.

EXAMPLE 8

The procedure for preparing the ionic conductive polymer gel No. 3 in Example 3 was repeated except that the ethylene carbonate/propylene carbonate/dimethyl carbonate (5/2/3 parts by weight) employed in Example 3 was replaced by propylene carbonate/dimethyl carbonate (5/5 parts by weight), whereby an ionic conductive polymer gel No. 8 of the present invention was prepared.

The ionic conductivity of the thus prepared ionic conductive polymer gel No. 8 was $2.4 \times 10^{-3}$ S/cm, and the modulus of elasticity thereof was $2.8 \times 10^3$ dyne/cm$^2$.

EXAMPLE 9

To 86 parts by weight of an electrolytic solution of LiN(CF$_3$SO$_2$)$_2$ with a concentration of 1.0 mol/l and LiBF$_4$ with a concentration of 1.0 mol/l in ethylene carbonate/propylene carbonate/dimethyl carbonate (5/2/3 parts by weight), there were added 13.8 parts by weight of ethoxydiethylene glycol acrylate serving as monofunctional acrylate monomer, 0.2 parts by weight of trimethylolpropane triacrylate, and 0.056 parts by weight of benzoin isopropyl ether serving as a photopolymerization initiator.

The above mixture was stirred to prepare a polymerizable solution.

This polymerizable solution was polymerized in the same manner as in Example 1, whereby an ionic conductive polymer gel No. 9 of the present invention was prepared.

The ionic conductivity of the thus prepared ionic conductive polymer gel No. 9 was $1.1 \times 10^{-3}$ S/cm, and the modulus of elasticity thereof was $3.8 \times 10^3$ dyne/cm$^2$.

EXAMPLE 10

The procedure for preparing the ionic conductive polymer gel No. 3 in Example 3 was repeated except that 13.8 parts by weight of ethoxydiethylene glycol acrylate serving as monofunctional acrylate monomer and 0.2 parts by weight of trimethylolpropane triacrylate employed in Example 3 were replaced by 25 parts by weight of methoxytetraethylene glycol acrylate serving as a monofunctional acrylate monomer, whereby an ionic conductive polymer gel No. 10 of the present invention was prepared.

The ionic conductivity of the thus prepared ionic conductive polymer gel No. 10 was $2.4 \times 10^{-3}$ S/cm, and the modulus of elasticity thereof was $1.6 \times 10^3$ dyne/cm$^2$.

EXAMPLE 11

The procedure for preparing the tonic conductive polymer gel No. 3 in Example 3 was repeated except that 0.056 parts by weight of benzoin isopropyl ether serving as a photopolymerization initiator employed in Example 3 were replaced by 0.028 parts by weight of benzoin isopropyl ether serving as a photopolymerization initiator and 0.043 parts by weight of bis(4-t-butyloyclohexyl)peroxidicarbonate serving as a thermal polymerization initiator in combination, whereby an ionic conductive polymer gel No. 11 of the present invention was prepared.

The ionic conductivity of the thus prepared ionic conductive polymer gel No. 11 was $2.3 \times 10^{-3}$ S/cm, and the modulus of elasticity thereof was $3.6 \times 10^3$ dyne/cm$^2$.

EXAMPLE 12

To 80 parts by weight of an electrolytic solution of LiN(CF$_3$SO$_2$)$_2$ with a concentration of 0.4 mol/l and LiPF$_6$ with a concentration of 1.6 mol/l in ethylene carbonate/propylene carbonate/diethyl carbonate (5/3/2 parts by weight), there were added 11.0 parts by weight of methyldiethylene glycol acrylate serving as a monofunctional acrylate monomer, 0.6 parts by weight of EO-modified trimethylolpropane triacrylate with a molecular weight of 470, and 0.04 parts by weight of methylbenzoylformate serving as a photopolymerization initiator.

The above mixture was stirred to prepare a polymerizable solution.

This polymerizable solution was polymerized in the same manner as in Example 1, whereby an ionic conductive polymer gel No. 12 of the present invention was prepared.

The ionic conductivity of the thus prepared ionic conductive polymer gel No. 12 was $3.0 \times 10^{-3}$ S/cm, and the modulus of elasticity thereof was $3.5 \times 10^3$ dyne/cm$^2$.

EXAMPLE 13

To 86 parts by weight of an electrolytic solution of LiN(CF$_3$SO$_2$)$_2$ with a concentration of 1.7 mol/l and LiBF$_4$ with a concentration of 0.3 mol/l in ethylene carbonate/propylene carbonate/dimethyl carbonate (4/2/4 parts by weight), there were added 13.8 parts by weight of ethoxydiethylene glycol acrylate serving as monofunctional acrylate monomer, 0.2 parts by weight of trimethylolpropane triacrylate, and 0.03 parts by weight of bis(4-t-butylcyclohexyl)peroxidicarbonate serving as a thermal polymerization initiator.

The above mixture was stirred to prepare a polymerizable solution.

This polymerizable solution was subjected to thermal polymerization at about 80° C., whereby an ionic conductive polymer gel No. 13 of the present invention was prepared.

The ionic conductivity of the thus prepared ionic conductive polymer gel No. 13 was $2.0 \times 10^{-3}$ S/cm, and the modulus of elasticity thereof was $2.9 \times 10^3$ dyne/cm$^2$.

EXAMPLES 14–26 AND COMPARATIVE EXAMPLES 5–8

Lithium-ion batteries Nos. 1–13 of the present invention and comparative secondary batteries Nos. 1–4 were fabricated by use of each of the polymarizable solutions prepared in Examples 1–13, and Comparative Examples 1–4.

More specifically, 2 parts by weight of polyvinylidene fluoride were dissolved in 58 parts by weight of N-methyl-2-pyrroalidone. To this solution, 40 parts by weight of coke sintered at 2500° C. were added, and the mixture was mixed and dispersed under an inert atmosphere in a roll mill, whereby a paste-like mixture was prepared.

The thus prepared paste-like mixture was coated on a 20 μm thick copper foil by a wire bar and dried, whereby an active material layer with a thickness of 60 μm was provided on the copper foil. Thus, a negative electrode was fabricated.

The above fabricated negative electrode and a lithium plate serving as a counter electrode were placed with a predetermined space therebetween.

The first mentioned polymerizable solution prepared in each of Examples 1–13 and Comparative Examples 1–4 was placed between the two electrodes, and irradiated with the light of a high-pressure mercury lamp, whereby the polymerizable solution was polymerized.

Thus, lithium-ion batteries Nos. 1–13 of the present invention and comparative secondary batteries Nos. 1–4 were fabricated.

Each of the thus fabricated secondary batteries was subjected to the following charging and discharging tests by using a commercially available charging and discharging test apparatus (Trademark "HJ-201B" made by Hoku-todenko Co., Ltd.):

Each secondary battery was charged with a current of (1/3)CmA until the negative electrode was charged up to 0 V with respect to the lithium electrode, and discharging was conducted to 0.8 V, whereby the energy density of each negative electrode was measured.

The above charging and discharging cycle was repeated and the energy density (mAh/g) at the 30st cycle and 300th cycle were measured. The results are shown in the following TABLE 1:

TABLE 1

| Examples | Energy Density (mAh/g) at 30th cycle | Energy Density (mAh/g) at 30th cycle |
|---|---|---|
| Ex. 14 | 285 | 242 |
| Ex. 15 | 287 | 247 |
| Ex. 16 | 293 | 255 |
| Ex. 17 | 274 | 246 |
| Ex. 18 | 290 | 235 |
| Ex. 19 | 250 | 200 |
| Ex. 20 | 282 | 234 |
| Ex. 21 | 269 | 217 |
| Ex. 22 | 289 | 231 |
| Ex. 23 | 278 | 234 |
| Ex. 24 | 285 | 251 |
| Ex. 25 | 297 | 247 |
| Ex. 26 | 278 | 223 |
| Comp. Ex. 5 | 232 | 139 |
| Comp. Ex. 6 | 240 | 150 |
| Comp. Ex. 7 | 195 | 115 |
| Comp. Ex. 8 | 218 | 102 |

Japanese Patent Application No. 7-135880 filed May 9, 1995, Japanese Patent Application No. 7-186371 filed Jun. 29, 1995 and Japanese Patent Application No. 7-225856 filed Aug. 10, 1995 are hereby incorporated by reference.

What is claimed is:

1. An ionic conductive polymer gel for secondary battery comprising:

an electrolyte salt component which comprises a sulfonated derivative with formula (A):

$$LiX(SO_2R^1)_n \qquad (A)$$

wherein X is N, C, B, O or $-C(R^2)_m-$ in which $R^2$ is a hydrogen atom, an alkyl group having 1 to 12 carbon atoms, and m is an integer of 1 to 2; $R^1$ is a halogenated alkyl group having 1 to 12 carbon atoms; and n is an integer of 1 to 3;

a non-aqueous solvent; and a polymer matrix prepared by polymerizing a polymerizable material comprising at least one acrylate monomer with a molecular weight of 1000 or less, in the presence of said electrolyte salt component and said non-aqueous solvent.

2. The ionic conductive polymer gel for secondary battery as claimed in claim 1, wherein said polymerizable material comprises at least two acrylate monomers, each having a molecular weight of 1000 or less, one acrylate monomer having an acrylic group in the molecule thereof, and the other having at least two acrylic groups in the molecule thereof.

3. The ionic conductive polymer gel for secondary battery as claimed in claim 2, wherein at least one of said acrylate monomers in said polymerizable material comprises an alkylene oxide group in the molecule thereof.

4. The ionic conductive polymer gel for secondary battery as claimed in claim 1, wherein said polymer matrix is formed by polymerization of said polymerizable material which utilizes a photochemical process.

5. The ionic conductive polymer gel for secondary battery as claimed in claim 1, wherein said polymer matrix is formed by polymerizing said polymerizable material in the presence of a photopolymerization initiator and a thermal polymerization initiator.

6. The ionic conductive polymer gel for secondary battery as claimed in claim 1, wherein said non-aqueous solvent comprises a cyclic carbonate and a chain carbonate.

7. The ionic conductive polymer gel for secondary battery as claimed in claim 1, wherein said non-aqueous solvent comprises propylene carbonate in an amount of 10 to 50 wt. % of the entire amount of said non-aqueous solvent.

8. The ionic conductive polymer gel for secondary battery as claimed in claim 6, wherein said cyclic carbonate is propylene carbonate, which is in an amount of 10 to 50 wt. % of the entire amount of said non-aqueous solvent.

9. The ionic conductive polymer gel for secondary battery as claimed in claim 1, wherein said electrolyte salt component further comprises an inorganic electrolyte salt.

10. The ionic conductive polymer gel for secondary battery as claimed in claim 9, wherein the amount ratio by weight of said sulfonated derivative to said inorganic electrolyte salt is in the range of 10:90 to 90:10.

11. A lithium-ion battery comprising an ionic conductive polymer gel, serving as an electrolyte, which comprises (a) an electrolyte salt component which comprises a sulfonated derivative with formula (A):

$$LiX(SO_2R^1)_n \qquad (A)$$

wherein X is N, C, B, O or $-C(R^2)_m-$ in which $R^2$ is a hydrogen atom or an alkyl group having 1 to 12 carbon atoms, and m is an integer of 1 to 2; $R^1$ is a halogenated alkyl group having 1 to 12 carbon atoms; and n is an integer of 0 to 3; (b) a non-aqueous solvent; and (c) a polymer matrix prepared by polymerizing a polymerizable material comprising at least one acrylate monomer with a molecular weight of 1000 or less, in the presence of said electrolyte salt component and said non-aqueous solvent.

12. The lithium-ion battery as claimed in claim 11, wherein said polymerizable material comprises at least two acrylate monomers, each having a molecular weight of 1000 or less, one acrylate monomer having an acrylic group in the molecule thereof, and the other having at least two acrylic functional groups in the molecule thereof.

13. The lithium-ion battery as claimed in claim 12, wherein at least one of said acrylate monomers in said polymerizable material comprises an alkylene oxide group in the molecule thereof.

14. The lithium-ion battery as claimed in claim 11, wherein said polymer matrix is formed by polymerization of said polymerizable material which utilizes a photochemical process.

15. The lithium-ion battery as claimed in claim 11, wherein said polymer matrix is formed by polymerizing said polymerizable material in the presence of a photopolymerization initiator and a thermal polymerization initiator.

16. The lithium-ion battery as claimed in claim 11, wherein said non-aqueous solvent comprises a cyclic carbonate and a chain carbonate.

17. The lithium-ion battery as claimed in claim 11, wherein said non-aqueous solvent comprises propylene carbonate in an amount of 10 to 50 wt. % of the entire amount of said non-aqueous solvent.

18. The lithium-ion battery as claimed in claim 16, wherein said cyclic carbonate is propylene carbonate, which is in an amount of 10 to 50 wt. % of the entire amount of said non-aqueous solvent.

19. The lithium-ion battery as claimed in claim 11, wherein said electrolyte salt component further comprises an inorganic electrolyte salt.

20. The lithium-ion battery as claimed in claim 18, wherein the amount ratio by weight of said sulfonated derivative to said inorganic electrolyte salt is in the range of 10:90 to 90:10.

* * * * *